Patented Aug. 18, 1942

2,293,266

UNITED STATES PATENT OFFICE 2,293,266

CHEMICAL APPARATUS

Joseph Arthur Musgrave Woodcock Mitchell, Runcorn, England, assignor to Imperial Chemical Industries Limited, a corporation of Great Britain No Drawing. Application May 16, 1940, Serial No. 335,552. In Great Britain June 15, 1939

6 Claims. (Cl. 117—66)

This invention relates to apparatus for the production and storage of fluorine and to the construction thereof.

It is usually necessary in apparatus for the manufacture of gases to have gaskets and jointing materials. In the electrolytic production of fluorine it has been proposed to use insulating and sealing materials made by treating rubber and artificial rubber-like masses with fluorine under mild conditions. During the treatment of these starting materials with fluorine care has to be exercised to ensure that the fluorine does not react in high concentration and so cause the rubber or like material to take fire.

According to the present invention apparatus for the production or storage of fluorine is constructed with packing, insulating or sealing materials prepared by subjecting rubber, artificial rubber-like masses or substitutes for rubber to treatment with hydrofluoric acid or an alkali metal polyfluoride.

The preparation of the materials for use according to the invention is conveniently effected by treating rubber or rubber-like masses with aqueous or anhydrous hydrofluoric acid or with an alkali metal polyfluoride for a period of time which may vary within wide limits according to the strength of the acid used (or in the case of an alkali metal polyfluoride to the proportion of acid contained in the polyfluoride) and the temperature at which the treatment is carried out. Suitable temperatures at which the treatment may be carried out are from 10° C. to 70° C. and over this range the period of time necessary is from 1 to 10 hours.

Besides natural rubber and artificial rubber-like masses which are obtained, for example, by the polymerisation of isoprenes and butadienes, admixtures of these substances with fillers, such as carbon black and zinc oxide, may also be subjected to this process.

In the construction of an electrolytic cell for the production of fluorine, sealing and insulating means made from rubber and the like which has been pretreated as described above can be built in, but it is likewise possible to provide the parts of the cell to be rendered fluid-tight or insulated with rubber or the like, which has not been pretreated and to effect the treatment subsequently by filling the assembled cell with the required amount of hydrofluoric acid or with alkali metal polyfluoride and treating it for the desired length of time.

The invention is illustrated by the following example all parts being by weight.

Example

In an apparatus for preparing fluorine by electrolysis, a packing consisting of neoprene was used for fluid-tightening and insulating the anode. A quantity of potassium polyfluoride was prepared from 30 parts of potassium fluoride and 70 parts of anhydrous hydrofluoric acid. Sufficient of this material to half fill the apparatus was then heated under reflux in the cell for a period of five hours after which treatment electrolysis could be carried out without damage to the packing material.

I claim:

1. An apparatus for the production or storage of fluorine having insulating and sealing materials prepared from a substance selected from the group consisting of rubber and artificial rubbers obtained from the polymerization of a material which is predominantly conjugated dienes by treatment with a compound from the group consisting of alkali metal polyfluorides and hydrofluoric acid.

2. An apparatus for the production or storage of fluorine having insulating and sealing materials prepared from a substance selected from the group consisting of rubber and artificial rubbers obtained from the polymerization of a material which is predominantly conjugated dienes by treatment with potassium polyfluoride.

3. An apparatus for the production or storage of fluorine having insulating and sealing means prepared by treating synthetic rubber obtained from the polymerization of a material which is predominantly conjugated dienes with potassium polyfluoride.

4. The method of constructing an apparatus in which a substance selected from the group consisting of rubber and artificial rubbers obtained from the polymerization of a material which is predominantly conjugated dienes is first built-in to the apparatus and subsequently treating the said substance with a compound chosen from the group consisting of alkali metal polyfluorides and hydrofluoric acid.

5. An apparatus for the production or storage of fluorine having insulating or sealing means prepared by treating neoprene with potassium polyfluoride.

6. An apparatus for the production or storage of fluorine having insulating or sealing means prepared by treating neoprene with hydrofluoric acid.

JOSEPH ARTHUR MUSGRAVE WOODCOCK MITCHELL.